(12) United States Patent
Uneme

(10) Patent No.: US 11,811,277 B2
(45) Date of Patent: Nov. 7, 2023

(54) ROTATING ELECTRIC MACHINE UNIT

(71) Applicant: Honda Motor Co., Ltd., Tokyo (JP)

(72) Inventor: Takahiro Uneme, Tokyo (JP)

(73) Assignee: Honda Motor Co., Ltd., Tokyo (JP)

(\*) Notice: Subject to any disclaimer, the term of this patent is extended or adjusted under 35 U.S.C. 154(b) by 95 days.

(21) Appl. No.: 17/503,355

(22) Filed: Oct. 17, 2021

(65) Prior Publication Data

US 2022/0190693 A1 Jun. 16, 2022

(30) Foreign Application Priority Data

Dec. 14, 2020 (JP) .................. 2020-206806

(51) Int. Cl.
| | |
|---|---|
| *H02K 11/38* | (2016.01) |
| *H02K 7/00* | (2006.01) |
| *B60K 17/06* | (2006.01) |
| *B60K 1/00* | (2006.01) |
| *B60K 17/22* | (2006.01) |
| *H02K 5/22* | (2006.01) |

(52) U.S. Cl.
CPC ............. *H02K 11/38* (2016.01); *B60K 1/00* (2013.01); *B60K 17/06* (2013.01); *B60K 17/22* (2013.01); *H02K 5/225* (2013.01); *H02K 7/003* (2013.01)

(58) Field of Classification Search
CPC ........ H02K 11/38; H02K 5/225; H02K 7/003; B60K 1/00; B60K 17/06; B60K 17/22
USPC ...................................................... 310/12.18
See application file for complete search history.

(56) References Cited

U.S. PATENT DOCUMENTS

| | | | |
|---|---|---|---|
| 7,786,640 B2 | 8/2010 | Sada et al. | |
| 8,272,462 B2 | 9/2012 | Yoshida et al. | |
| 8,344,566 B2 | 1/2013 | Koshida | |
| 11,192,448 B2 | 12/2021 | Mepham et al. | |
| 2006/0224282 A1 | 10/2006 | Seo et al. | |

(Continued)

FOREIGN PATENT DOCUMENTS

| | | | | |
|---|---|---|---|---|
| CN | 101553972 | \* | 10/2009 | ............. H02K 5/203 |
| CN | 111108012 | | 5/2020 | |

(Continued)

OTHER PUBLICATIONS

Machine translation of KR100763246;; Takenaka et al.; Oct. 2007.\*

(Continued)

*Primary Examiner* — Terrance L Kenerly
(74) *Attorney, Agent, or Firm* — JCIPRNET

(57) ABSTRACT

A rotating electric machine unit includes a first and second rotating electric machine, a power control unit (PCU), a drive shaft, and a power transmission part. The first and second rotating electric machines have rotary shafts parallel to each other, and are disposed along a vehicle front-rear direction orthogonal to an axial direction of each rotary shaft. The PCU is disposed below the first and the second rotating electric machines in a vehicle up-down direction orthogonal to the axial direction of each rotary shaft. The drive shaft is disposed below the first rotating electric machine and behind the PCU. The power transmission part transmitting power between each rotary shaft and the drive shaft is disposed on the right side of each rotating electric machine and the PCU. A direction in which an outer shape of the PCU is longest is parallel to the vehicle front-rear direction.

6 Claims, 5 Drawing Sheets

(56) References Cited

U.S. PATENT DOCUMENTS

2009/0251018 A1* 10/2009 Koshida ................ H02K 5/225
310/71
2020/0156454 A1 5/2020 Yaguchi et al.

FOREIGN PATENT DOCUMENTS

| EP | 3587157 | 1/2020 | | |
|----|---------|--------|---|---|
| EP | 3597463 | 1/2020 | | |
| FR | 2942923 | 9/2010 | | |
| JP | 2008193863 | 8/2008 | | |
| JP | 2008290621 | 12/2008 | | |
| JP | 2008301562 | 12/2008 | | |
| JP | 2009254144 | 10/2009 | | |
| JP | 2009262857 | 11/2009 | | |
| JP | 2010105492 | 5/2010 | | |
| JP | 2018085208 | 5/2018 | | |
| KR | 100763246 | * 10/2007 | ............... | B60K 6/22 |

OTHER PUBLICATIONS

"Office Action of China Counterpart Application", dated Mar. 22, 2023, with English translation thereof, pp. 1-14.
Office Action of Japan Counterpart Application, with English translation thereof, dated Jun. 20, 2023, pp. 1-12.

* cited by examiner

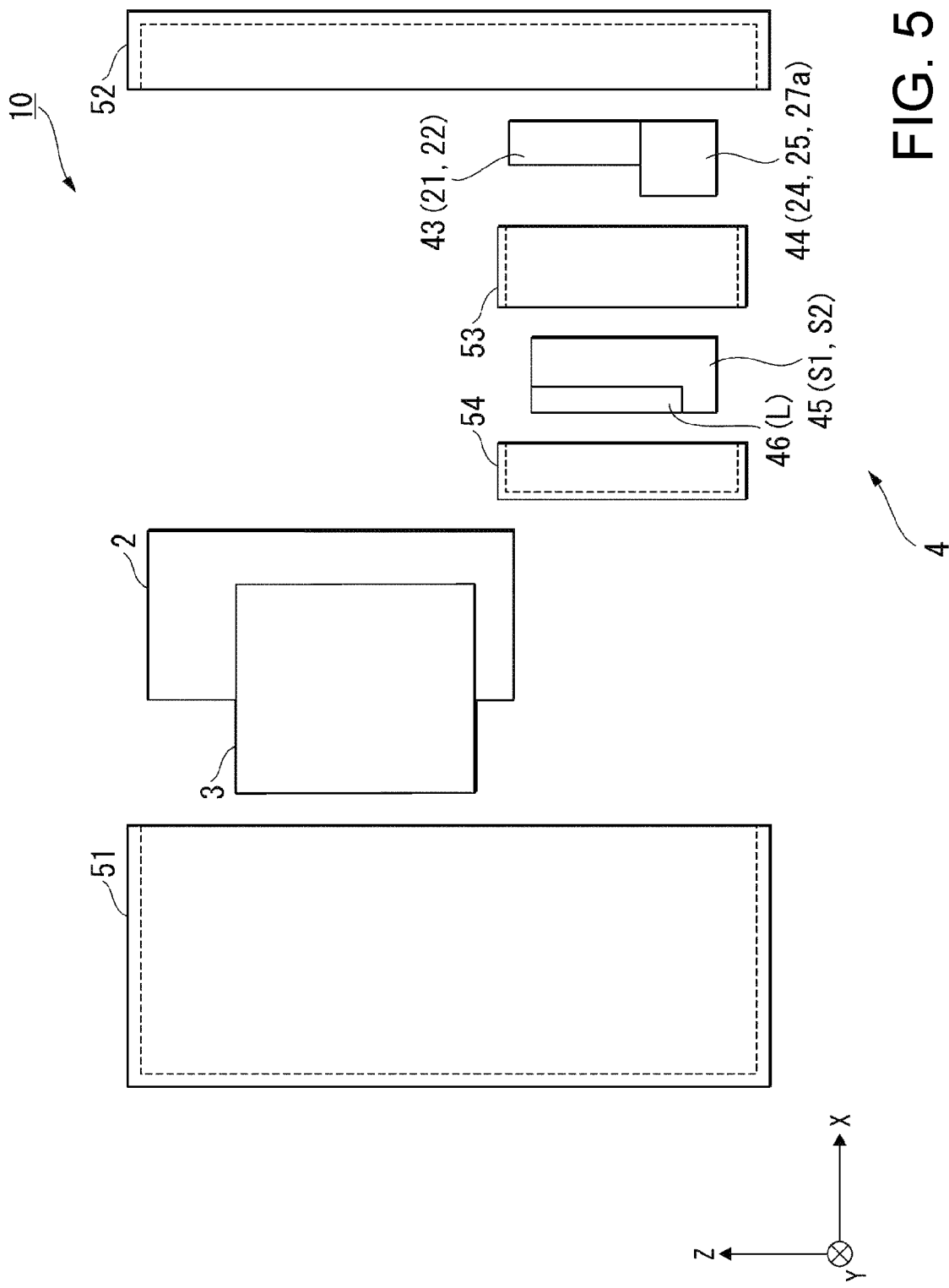

ROTATING ELECTRIC MACHINE UNIT

CROSS-REFERENCE TO RELATED APPLICATIONS

This application claims the priority benefit of Japan Application No. 2020-206806, filed on Dec. 14, 2020. The entirety of the above-mentioned patent application is hereby incorporated by reference herein and made a part of this specification.

BACKGROUND

Technical Field

The disclosure relates to a rotating electric machine unit.

Related Art

Conventionally, for example, there has been known a vehicle mounted with a rotating electric machine unit and a drive shaft disposed offset from a rotary shaft of the rotating electric machine unit, in which the rotating electric machine unit includes two rotating electric machines disposed along the same axis, gears and a reactor (see, for example, Patent Document 1). The rotating electric machine unit includes an element module disposed in a lower part in a vehicle up-down direction and a DC power connector disposed in an upper part in the vehicle up-down direction.

Conventionally, for example, there has been known a vehicle driving device including two rotating electric machines disposed along the same axis, gears and a drive shaft disposed offset from rotary shafts of the two rotating electric machines, and two split inverters connected to the two rotating electric machines (see, for example, Patent Document 2). The two inverters of the vehicle driving device are disposed below the two rotating electric machines in the vehicle up-down direction, and are connected to the two rotating electric machines on one side in an axial direction of the rotary shafts of the two rotating electric machines.

PATENT DOCUMENTS

[Patent Document 1] Japanese Patent Laid-open No. 2008-193863
[Patent Document 2] Japanese Patent Laid-open No. 2008-301562

By the way, as in the above-mentioned conventional vehicle, due to that the rotating electric machine unit and the drive shaft are disposed offset from each other as viewed from each axial direction of the rotating electric machine unit and the drive shaft, there is a risk that surplus space may be formed around the drive shaft in the vehicle up-down direction and layout efficiency may be reduced. In addition, since the DC power connector is disposed in the upper part in the vehicle up-down direction with respect to the element module in the lower part in the vehicle up-down direction, there arises a problem that the length of the wiring connected to the DC power connector increases.

In addition, as in the above-mentioned conventional vehicle driving device, in the case where the two inverters are disposed in a split manner, there arises a problem that the device configuration is increased in size. Since the two rotating electric machines disposed along the same axis are connected to the two inverters on one side in the axial direction, there are risks that the wiring connecting the two rotating electric machines and the two inverters may be lengthened and assembly man-hours may increase. In the case where a longest one of surfaces of the two inverters faces two motors in the vehicle up-down direction, the area where the two motors and the inverters overlap the gears and the drive shaft is small as viewed from a vehicle left-right direction, and there is a risk that layout efficiency may be reduced.

SUMMARY

A rotating electric machine unit according to an aspect of the disclosure includes: multiple rotating electric machines, having rotary shafts parallel to each other, and disposed along a first direction orthogonal to an axial direction parallel to each of the rotary shafts; a power control unit, controlling power transfer of each of the rotating electric machines and disposed on one side with respect to the rotating electric machines in a second direction orthogonal to the axial direction and the first direction; a drive shaft, parallel to the axial direction, disposed on the one side with respect to any of the rotating electric machines in the second direction and disposed on one side with respect to the power control unit in the first direction; and a power transmission part, transmitting power between each of the rotary shafts of the rotating electric machines and the drive shaft and disposed on one side with respect to the rotating electric machines and the power control unit in the axial direction. A direction in which an outer shape of the power control unit is longest is parallel to the first direction.

BRIEF DESCRIPTION OF THE DRAWINGS

FIG. 5 is an exploded view of a rotating electric machine unit according to an embodiment of the disclosure as viewed from the front-rear direction of the vehicle.

DESCRIPTION OF THE EMBODIMENTS

Figure 1:
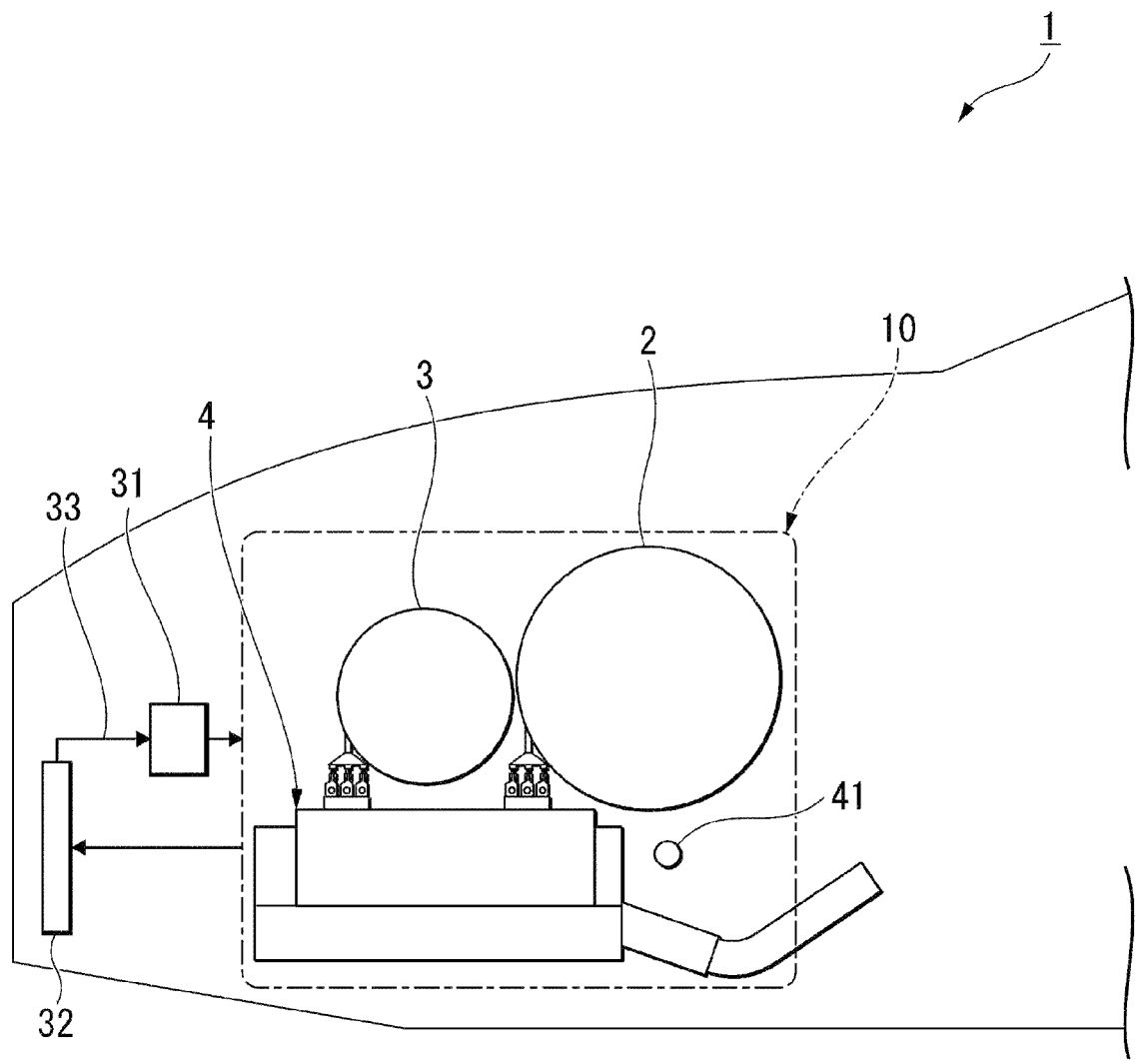
FIG. 1 is a configuration diagram of a part of a vehicle mounted with a rotating electric machine unit according to an embodiment of the disclosure.

The disclosure provides a rotating electric machine unit capable of improving arrangement efficiency.

The disclosure adopts the following aspects.

(1) A rotating electric machine unit (for example, rotating electric machine unit 10 in an embodiment) according to an aspect of the disclosure includes: multiple rotating electric machines (for example, first rotating electric machine 2 and second rotating electric machine 3 in an embodiment), having rotary shafts (for example, rotary shaft 2a and rotary shaft 3a in an embodiment) parallel to each other, and disposed along a first direction (for example, front-rear direction of vehicle 1 in an embodiment) orthogonal to an axial direction parallel to each of the rotary shafts; a power control unit (for example, power control unit 4 in an embodiment), controlling power transfer of each of the rotating electric machines and disposed on one side (for example, below in an embodiment) with respect to the rotating electric machines in a second direction (for example, up-down direction of vehicle 1 in an embodiment) orthogonal to the axial direction and the first direction; a drive shaft (for example, drive shaft 41 in an embodiment), parallel to the axial direction, disposed on the one side with respect to any of the rotating electric machines in the second direction and disposed on one side (for example, behind in an embodiment) with respect to the power control unit in the first direction; and a power transmission part (for example, power transmission part 42 in an embodiment), transmitting power between each of the rotary shafts of the rotating electric machines and the drive shaft and disposed on one side (for example, right side of vehicle 1 in left-right direction in an embodiment) with respect to the rotating electric machines and the power control unit in the axial direction. A direction in which an outer shape of the power control unit is longest is parallel to the first direction.

(2) The rotating electric machine unit described in the above (1) may include an electric wire (for example, DC cable 61 in an embodiment) connected to the power control unit on the one side in the first direction and disposed on the one side with respect to the drive shaft in the second direction.

(3) The rotating electric machine unit described in the above (1) or (2) may include a connection part (for example, three-phase connector 28a and three-phase connector 28b in an embodiment) connecting each of the rotating electric machines with the power control unit on one side (for example, left side of vehicle 1 in left-right direction in an embodiment) in the axial direction.

(4) In the rotating electric machine unit described in the above (3), a longest surface (for example, surface 4A in an embodiment) of the outer shape of the power control unit may be orthogonal to the axial direction.

(5) In the rotating electric machine unit described in any one of the above (1) to (4), the power control unit may include a first module (for example, first module 43 in an embodiment) having multiple power semiconductor elements (for example, each of transistors UH, VH, WH, UL, VL, and WL and each freewheeling diode in an embodiment) and a second module (for example, second module 44 in an embodiment) having at least one capacitor (for example, first smoothing condenser 24, second smoothing condenser 25 and two condensers 27a in an embodiment) connected to the first module. The second module may be disposed on the one side with respect to the first module in the second direction.

(6) In the rotating electric machine unit described in any one of the above (1) to (5), the rotating electric machine unit may be mounted on a vehicle (for example, vehicle 1 in an embodiment). The axial direction may be parallel to a left-right direction of the vehicle, the first direction may be parallel to a front-rear direction of the vehicle, and the second direction may be parallel to an up-down direction of the vehicle.

According to the above (1), due to that the power control unit and the drive shaft are disposed on one side in the second direction with respect to the rotating electric machines arranged in the first direction, and the direction in which the outer shape of the power control unit is longest is parallel to the first direction, the rotating electric machines, the power control unit and the drive shaft can be disposed in a compact manner. Further, due to that the power transmission part is disposed on one side with respect to the rotating electric machines and the power control unit in the axial direction of each rotary shaft of the rotating electric machines, arrangement efficiency of the rotating electric machine unit can be improved compared to the case where the power transmission part is disposed, for example, along the first direction or the second direction.

In the case of the above (2), by providing the electric wire connected to the power control unit on one side in the first direction and disposed on one side with respect to the drive shaft in the second direction, an increase in size of an introduction path of the electric wire can be suppressed. Due to that the electric wire does not interfere with the power transmission part in the first direction, even if there is a possibility that, for example, the power transmission part is displaced in the first direction, damage caused to the electric wire by the power transmission part can be suppressed.

In the case of the above (3), by providing the connection part connecting each of the rotating electric machines with the power control unit on one side in the axial direction, an increase in the length required for connecting each of the rotating electric machines with the power control unit can be suppressed. The configuration and assembly process required for connection can be simplified without requiring, for example, a special extension member for connection.

In the case of the above (4), due to that the largest surface of the outer shape of the power control unit is orthogonal to the axial direction, the area where the power control unit overlaps the power transmission part as viewed from the axial direction can be increased, and the arrangement efficiency of the rotating electric machine unit can be improved.

In the case of the above (5), due to that the first module is disposed between the rotating electric machines and the second module in the second direction, heat generated from the rotating electric machines can be suppressed from being transferred to the second module.

In the case of the above (6), due to that the axial direction of each rotary shaft of the rotating electric machines, the first direction, and the second direction are sequentially parallel to the left-right direction, the front-rear direction, and the up-down direction of the vehicle, even if there is a possibility that the rotating electric machines and the power transmission part are displaced in the first direction in the event of, for example, a vehicle collision, damage caused to the power control unit by the rotating electric machines and the power transmission part can be suppressed.

A rotating electric machine unit 10 according to an embodiment of the disclosure is described below with reference to the accompanying drawings.

Figure 2:
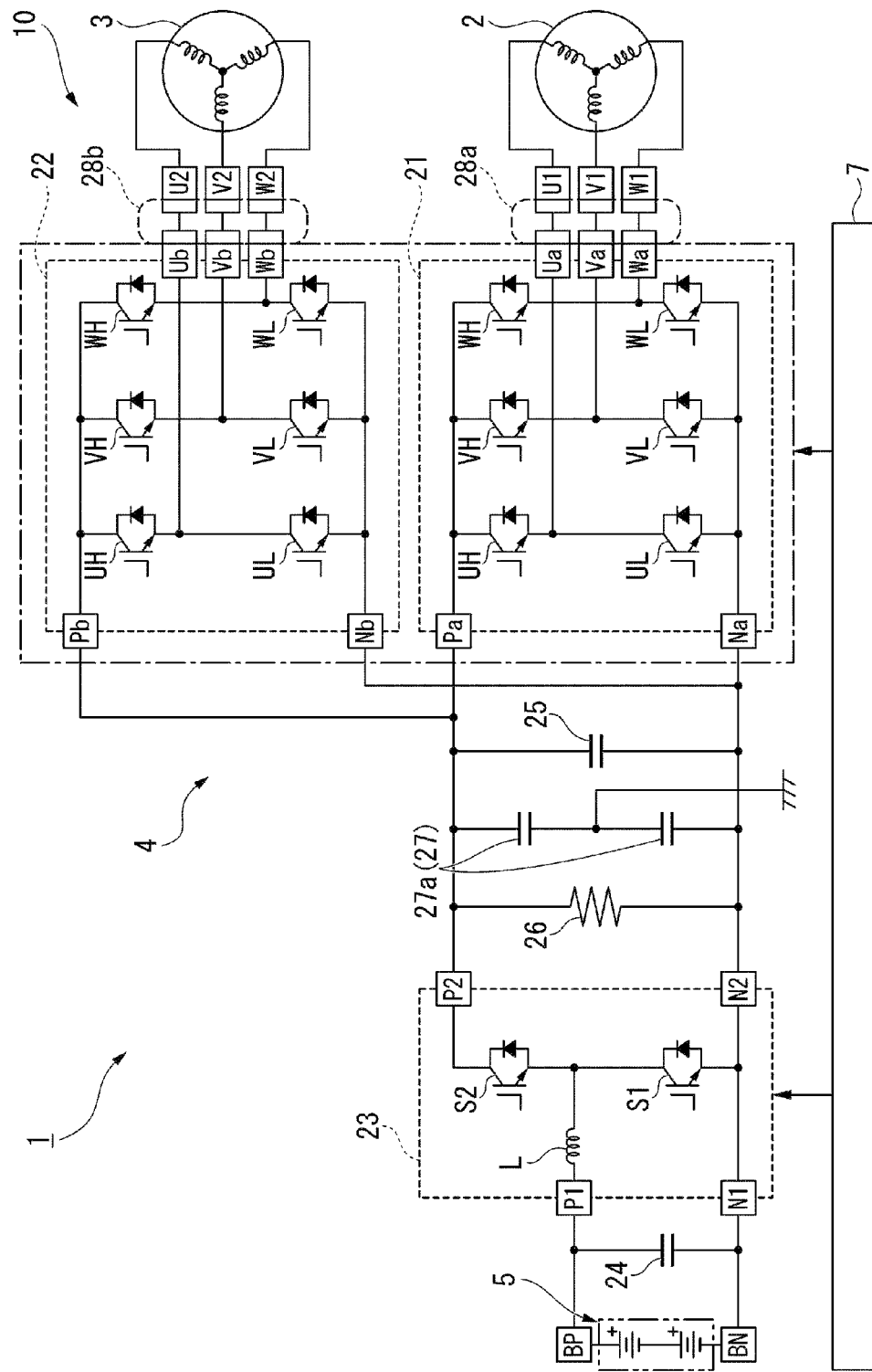
FIG. 2 is a configuration diagram of a vehicle mounted with a rotating electric machine unit according to an embodiment of the disclosure.

FIG. 1 illustrates a configuration of a part of a vehicle 1 mounted with the rotating electric machine unit 10 according to an embodiment. FIG. 2 is a configuration diagram of the vehicle 1 mounted with the rotating electric machine unit 10 according to an embodiment.

In the following, each axial direction of an X-axis, a Y-axis, and a Z-axis orthogonal to each other in a three-dimensional space is a direction parallel to each axis. For example, as shown in FIG. 1, the Z-axis direction is parallel to an up-down direction of the vehicle 1, the X-axis direction is parallel to a left-right direction of the vehicle 1, and the Y-axis direction is parallel to a front-rear direction of the vehicle 1. The positive direction in the Z-axis direction is parallel to the upward direction in the up-down direction of the vehicle 1. The positive direction in the X-axis direction is parallel to the leftward direction in the left-right direction of the vehicle 1. The positive direction in the Y-axis direction is parallel to the rearward direction in the front-rear direction of the vehicle 1.

<Vehicle>

The rotating electric machine unit 10 according to the present embodiment is mounted on the vehicle 1 such as an electric vehicle. The electric vehicle includes an electric car, a hybrid vehicle, a fuel cell vehicle, or the like. The electric car is powered by a battery. The hybrid vehicle is powered by a battery and an internal combustion engine. The fuel cell vehicle is powered by a fuel cell.

As shown in FIG. 2, the vehicle 1 includes, for example, a first rotating electric machine 2, a second rotating electric machine 3, a power control unit 4, a battery 5, an electronic control unit 6, and a gate drive unit 7.

The first rotating electric machine 2 is, for example, for driving the vehicle 1 to travel, and generates a rotational driving force by performing power running by power supplied from the battery 5 via the power control unit 4. The first rotating electric machine 2 may also generate electric power by performing a regenerative operation by rotational power input to a rotary shaft from a wheel side.

The second rotating electric machine 3 is, for example, for power generation of the vehicle 1, and generates electric power by the rotational power input to a rotary shaft. The second rotating electric machine 3, for example, generates electricity by power of an internal combustion engine in the case where the second rotating electric machine 3 can be connected to the internal combustion engine. The second rotating electric machine 3, for example, generates electric power by performing a regenerative operation by the rotational power input to the rotary shaft from the wheel side in the case where the second rotating electric machine 3 can be connected to the wheel. In the case where the second rotating electric machine 3 can be connected to the wheel, the second rotating electric machine 3 may also generate a rotational driving force by performing power running by the power supplied from the battery 5 via the power control unit 4.

For example, each of the first rotating electric machine 2 and the second rotating electric machine 3 is a three-phase alternating-current brushless DC motor. The three phases are U phase, V phase, and W phase. The first rotating electric machine 2 and the second rotating electric machine 3 each include a rotor having a permanent magnet serving as a field magnet and a stator having three phase stator windings for generating a rotating magnetic field for rotating the rotor. The three phase stator windings are connected to the power control unit 4.

The power control unit 4 includes, for example, a first power converter 21 and a second power converter 22, a third power converter 23, a first smoothing condenser 24 and a second smoothing condenser 25, a resistor 26, and a noise filter 27.

The first power converter 21 and the second power converter 22 include, for example, the same circuit such as an inverter that performs power conversion between direct current and alternating current. Each of the first power converter 21 and the second power converter 22 includes a positive electrode terminal and a negative electrode terminal, as well as three phase terminals, namely, a U-phase terminal, a V-phase terminal, and a W-phase terminal.

A positive electrode terminal Pa of the first power converter 21 and a positive electrode terminal Pb of the second power converter 22 are connected to a second positive electrode terminal P2 of the third power converter 23. A negative electrode terminal Na of the first power converter 21 and a negative electrode terminal Nb of the second power converter 22 are connected to a second negative electrode terminal N2 of the third power converter 23.

Phase terminals Ua, Va, and Wa of the three phases of the first power converter 21 are respectively connected to terminals U1, V1, and W1 of the three phase stator windings of the first rotating electric machine 2 via a three-phase connector 28a. Phase terminals Ub, Vb, and Wb of the three phases of the second power converter 22 are respectively connected to terminals U2, V2, and W2 of the three phase stator windings of the second rotating electric machine 3 via a three-phase connector 28b.

Each of the first power converter 21 and the second power converter 22 includes, for example, a bridge circuit formed of multiple switching elements and rectifying elements that are three-phase bridge connected. The switching element is a transistor such as an insulated-gate bipolar transistor (IGBT) or a metal-oxide-semiconductor field-effect transistor (MOSFET). The rectifying element is a diode connected in parallel to each transistor.

The bridge circuit includes a high side arm U-phase transistor UH paired with a low side arm U-phase transistor UL, a high side arm V-phase transistor VH paired with a low side arm V-phase transistor VL, and a high side arm W-phase transistor WH paired with a low side arm W-phase transistor WL. The bridge circuit includes, between a collector and an emitter of each of the transistors UH, UL, VH, VL, WH, and WL, a freewheeling diode connected in a forward direction from the emitter to the collector.

The collector of each of the transistors UH, VH, and WH of the high side arm is connected to a positive electrode terminal (positive electrode terminal Pa or positive electrode terminal Pb). The emitter of each of the transistors UL, VL, and WL of the low side arm is connected to a negative electrode terminal (negative electrode terminal Na or negative electrode terminal Nb). In each of the three phases, the emitter of each of the transistors UH, VH, and WH of the high side arm and the collector of each of the transistors UL, VL, and WL of the low side arm are connected to each phase terminal (each of the phase terminals Ua, Va, and Wa or each of the phase terminals Ub, Vb, and Wb) of the three phases.

Each of the first power converter 21 and the second power converter 22 controls operation of each of the first rotating electric machine 2 and the second rotating electric machine 3. The first power converter 21 and the second power converter 22 each switch a transistor pair of each phase ON (conducting) or OFF (cutoff) based on a gate signal being a switching command input to a gate of each of the transistors UH, VH, WH, UL, VL, and WL.

The first power converter 21 and the second power converter 22 each convert DC power input from each of the positive electrode terminals Pa and Pb and each of the negative electrode terminals Na and Nb into three-phase AC power and supplies it to each of the first rotating electric machine 2 and the second rotating electric machine 3 during, for example, power running of each of the first rotating electric machine 2 and the second rotating electric machine 3. The first power converter 21 and the second power converter 22 each generate a rotational driving force by sequentially commuting a current to the three phase stator windings of each of the first rotating electric machine 2 and the second rotating electric machine 3.

For example, during regeneration of each of the first rotating electric machine 2 and the second rotating electric machine 3, the first power converter 21 and the second power converter 22 each convert three-phase AC power input from each of the phase terminals Ua, Va, Wa, Ub, Vb, and Wb of the three phases into DC power by performing ON (conducting)/OFF (cutoff) driving on the transistor pair of each phase synchronized with rotation of each of the first rotating electric machine 2 and the second rotating electric machine 3. It is possible that each of the first power converter 21 and the second power converter 22 supplies the DC power converted from the three-phase AC power to the battery 5 via the third power converter 23.

The third power converter 23 includes, for example, a DC-DC converter performing bidirectional step-up and step-down power conversion. The third power converter 23 includes a first positive electrode terminal P1 and a first negative electrode terminal N1, and the second positive electrode terminal P2 and the second negative electrode terminal N2.

The first positive electrode terminal P1 and the first negative electrode terminal N1 of the third power converter 23 are connected to a positive electrode terminal BP and a negative electrode terminal BN of the battery 5. The second positive electrode terminal P2 and the second negative electrode terminal N2 of the third power converter 23 are respectively connected to the positive electrode terminals Pa and Pb and the negative electrode terminals Na and Nb of the first power converter 21 and the second power converter 22.

The third power converter 23 includes, for example, a pair of switching elements of a low side arm and a high side arm, a rectifying element, and a reactor. The switching element is a transistor such as an IGBT or MOSFET. The pair of switching elements of the low side arm and the high side arm includes a first transistor S1 of the low side arm and a second transistor S2 of the high side arm. The rectifying element is a freewheeling diode connected in parallel in the forward direction from an emitter to a collector between the collector and the emitter of each of the first transistor S1 and the second transistor S2. The reactor is a choke coil L.

The emitter of the first transistor S1 of the low side arm is connected to the first negative electrode terminal N1 and the second negative electrode terminal N2. The collector of the second transistor S2 of the high side arm is connected to the second positive electrode terminal P2. The collector of the first transistor S1 and the emitter of the second transistor S2 are connected to a first end of both ends of the choke coil L. A second end of the both ends of the choke coil L is connected to the first positive electrode terminal P1.

The third power converter 23 switches each of the first transistor S1 and the second transistor S2 ON (conducting) or OFF (cutoff) based on a gate signal being a switching command input to a gate of each of the first transistor S1 and the second transistor S2.

During step-up, the third power converter 23 steps up the power input from the battery 5 to the first positive electrode terminal P1 and the first negative electrode terminal N1, and outputs the power after step-up from the second positive electrode terminal P2 and the second negative electrode terminal N2. The third power converter 23 accumulates magnetic energy by DC excitation of the reactor (choke coil L) when the second transistor S2 of the high side arm is turned OFF (cut off) and the first transistor S1 of the low side arm is turned ON (conducted).

By overlap of an induced voltage generated by the magnetic energy of the reactor (choke coil L) when the second transistor S2 of the high side arm is turned ON (conducted) and the first transistor S1 of the low side arm is turned OFF (cut off) and a voltage applied to the first positive electrode terminal P1 and the first negative electrode terminal N1, the third power converter 23 causes a higher voltage than that of the first positive electrode terminal P1 and the first negative electrode terminal N1 to be generated in the second positive electrode terminal P2 and the second negative electrode terminal N2.

During step-down, the third power converter 23 steps down the power input from the second positive electrode terminal P2 and the second negative electrode terminal N2, and outputs the power after step-down from the first positive electrode terminal P1 and the first negative electrode terminal N1 to the battery 5. The third power converter 23 accumulates magnetic energy by DC excitation of the reactor (choke coil L) when the second transistor S2 of the high side arm is turned ON (conducted) and the first transistor S1 of the low side arm is turned OFF (cut off). By step-down of an induced voltage generated by the magnetic energy of the reactor (choke coil L) when the second transistor S2 of the high side arm is turned OFF (cut off) and the first transistor S1 of the low side arm is turned ON (conducted), the third power converter 23 causes a lower voltage than that of the second positive electrode terminal P2 and the second negative electrode terminal N2 to be generated in the first positive electrode terminal P1 and the first negative electrode terminal N1.

The first smoothing condenser (first smoothing capacitor) 24 is connected between the first positive electrode terminal P1 and the first negative electrode terminal N1 of the third power converter 23. The first smoothing condenser 24 is connected in parallel to the battery 5. The first smoothing condenser 24 smooths voltage fluctuation that occurs with an ON/OFF switching operation of the first transistor S1 and the second transistor S2 at the time of step-down of the third power converter 23.

The second smoothing condenser (second smoothing capacitor) 25 is connected between the second positive electrode terminal P2 and the second negative electrode terminal N2 of the third power converter 23. The second smoothing condenser 25 smooths voltage fluctuation that occurs with the ON/OFF switching operation of each of the transistors UH, UL, VH, VL, WH, and WL of the first power converter 21 and the second power converter 22. The second smoothing condenser 25 smooths voltage fluctuation that occurs with the ON/OFF switching operation of the first transistor S1 and the second transistor S2 at the time of step-up of the third power converter 23.

The resistor 26 is connected between the positive electrode terminal Pa and the negative electrode terminal Na of the first power converter 21, between the positive electrode terminal Pb and the negative electrode terminal Nb of the second power converter 22, and between the second positive electrode terminal P2 and the second negative electrode terminal N2 of the third power converter 23.

The noise filter 27 is connected between the positive electrode terminal Pa and the negative electrode terminal Na of the first power converter 21, between the positive electrode terminal Pb and the negative electrode terminal Nb of the second power converter 22, and between the second positive electrode terminal P2 and the second negative electrode terminal N2 of the third power converter 23. The noise filter 27 includes two condensers (capacitors) 27a connected in series. A connection point of the two condensers 27a is connected to a body ground or the like of the vehicle 1.

The battery 5 is, for example, a high-voltage battery being a power source of the vehicle 1. The battery 5 includes a battery case and multiple battery modules housed in the battery case. The battery module includes multiple battery cells connected in series or in parallel.

The battery 5 includes the positive electrode terminal BP connected to the first positive electrode terminal P1 of the third power converter 23 and the negative electrode terminal BN connected to the first negative electrode terminal N1 of the third power converter 23. The positive electrode terminal BP and the negative electrode terminal BN of the battery 5 are connected to a positive electrode end and a negative electrode end of the battery modules connected in series in the battery case.

The electronic control unit 6 controls operation of each of the first rotating electric machine 2 and the second rotating electric machine 3. For example, the electronic control unit 6 is a software function part that functions by executing a predetermined program by a processor such as a central processing unit (CPU). The software function part is an electronic control unit (ECU) including a processor such as a CPU, a read-only memory (ROM) storing a program, a random-access memory (RAM) temporarily storing data, and an electronic circuit such as a timer. At least a part of the electronic control unit 6 may be an integrated circuit such as large scale integration (LSI).

For example, the electronic control unit 6 executes current feedback control using a current detection value of the first rotating electric machine 2 and a current target value corresponding to a torque command value of the first rotating electric machine 2, and generates a control signal to be input to the gate drive unit 7.

For example, the electronic control unit 6 executes current feedback control using a current detection value of the second rotating electric machine 3 and a current target value corresponding to a regeneration command value of the second rotating electric machine 3, and generates the control signal to be input to the gate drive unit 7.

The control signal is a signal indicating a timing for performing ON (conducting)/OFF (cutoff) driving on each of the transistors UH, VH, WH, UL, VL, and WL of the first power converter 21 and the second power converter 22. For example, the control signal is a pulse width modulated signal or the like.

The electronic control unit 6 controls the bidirectional step-up and step-down power conversion of the third power converter 23. For example, the electronic control unit 6 generates the control signal to be input to gate drive unit 7 using a current target value corresponding to a step-up voltage command at the time of step-up of the third power converter 23 or a step-down voltage command at the time of step-down of the third power converter 23. The control signal is a signal indicating a timing for performing ON (conducting)/OFF (cutoff) driving on each of the first transistor S1 and the second transistor S2 of the third power converter 23.

Based on the control signal received from the electronic control unit 6, the gate drive unit 7 generates the gate signal for actually performing ON (conducting)/OFF (cutoff) driving on each of the transistors UH, VH, WH, UL, VL, and WL of the first power converter 21 and the second power converter 22. For example, the gate signal is generated by performing amplification, level shift or the like on the control signal.

The gate drive unit 7 generates the gate signal for performing ON (conducting)/OFF (cutoff) driving on each of the first transistor S1 and the second transistor S2 of the third power converter 23. For example, the gate drive unit 7 generates the gate signal having a duty ratio corresponding to the step-up voltage command at the time of step-up of the third power converter 23 or the step-down voltage command at the time of regeneration of the third power converter 23. The duty ratio is a ratio of ON time of the first transistor S1 to ON time of the second transistor S2.

As shown in FIG. 1, the vehicle 1 includes the rotating electric machine unit 10, and an expansion tank 31 and a radiator 32 of a cooling system. The expansion tank 31 and the radiator 32 are connected to a cooling system 33 circulating a coolant cooling the rotating electric machine unit 10. The expansion tank 31 is disposed at the top of the cooling system 33 in the up-down direction of the vehicle 1.

The expansion tank 31 is, for example, disposed between the radiator 32 and the rotating electric machine unit 10 in the front-rear direction of the vehicle 1. The expansion tank 31 liquefies and stores vapor of the coolant discharged from the radiator 32, and returns the liquefied coolant to the radiator 32.

The radiator 32 is disposed in the front part of the vehicle 1 in the front-rear direction. The radiator 32 cools the coolant by exchanging heat with the outside air being the wind caused by traveling the vehicle 1.

<Rotating Electric machine Unit>

Figure 3:
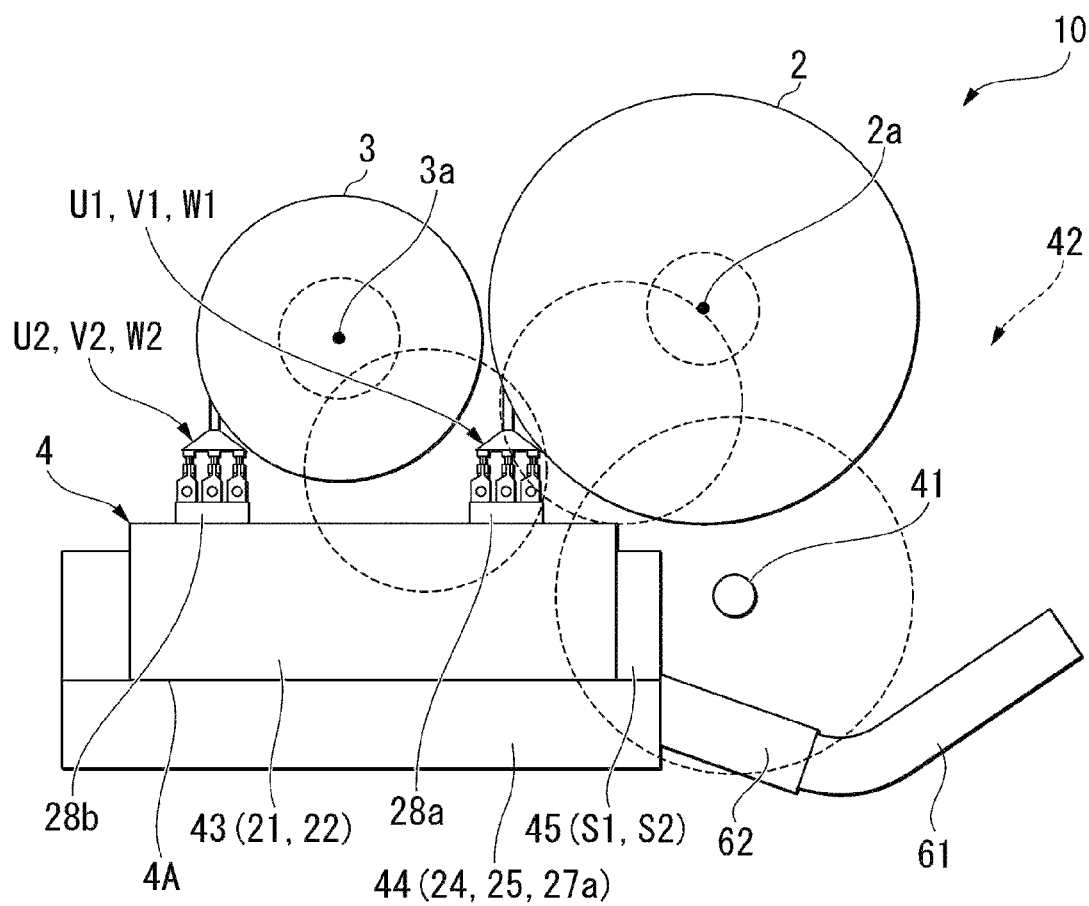
FIG. 3 is a configuration diagram of a rotating electric machine unit according to an embodiment of the disclosure as viewed from a left-right direction of a vehicle.
Figure 4:
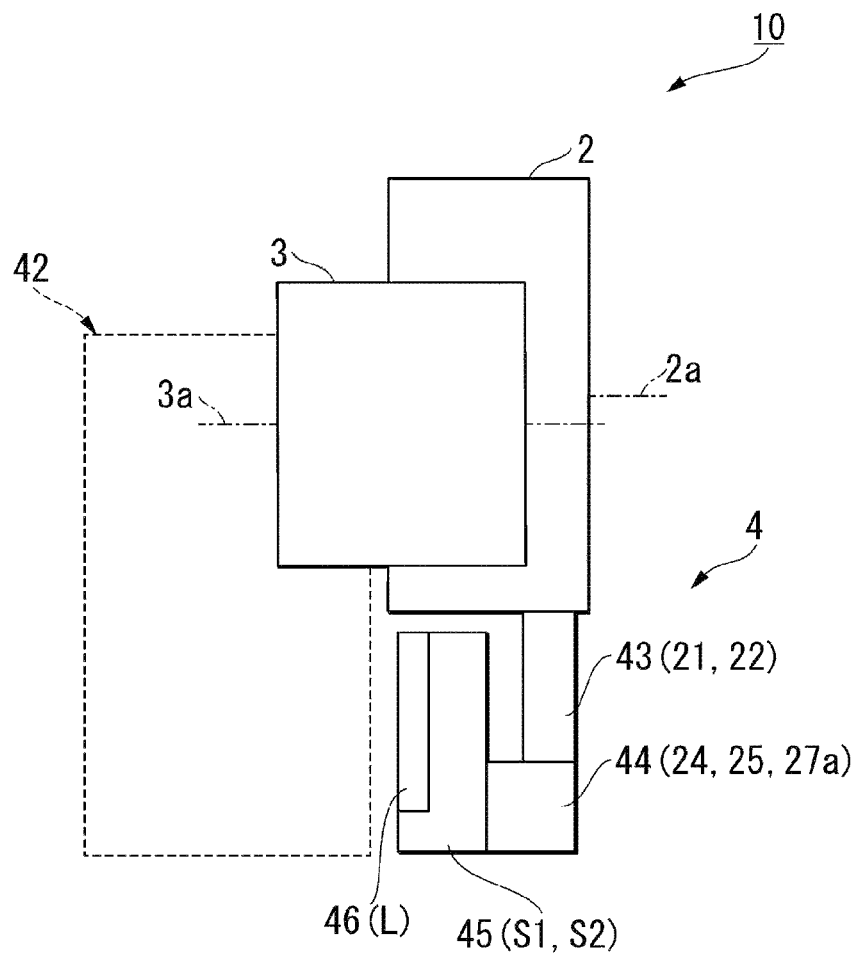
FIG. 4 is a configuration diagram of a rotating electric machine unit according to an embodiment of the disclosure as viewed from a front-rear direction of a vehicle.

FIG. 3 is a configuration diagram of the rotating electric machine unit 10 according to an embodiment as viewed from the left-right direction of the vehicle 1. FIG. 4 is a configuration diagram of the rotating electric machine unit 10 according to an embodiment as viewed from the front-rear direction of the vehicle 1. FIG. 5 is an exploded view of the rotating electric machine unit 10 according to an embodiment as viewed from the front-rear direction of the vehicle 1.

As shown in FIG. 1, FIG. 3, FIG. 4 and FIG. 5, the rotating electric machine unit 10 includes the first rotating electric machine 2, the second rotating electric machine 3, the power control unit 4, a drive shaft 41, and a power transmission part 42.

A rotary shaft 2a of the first rotating electric machine 2 and a rotary shaft 3a of the second rotating electric machine 3 are parallel to the left-right direction of the vehicle 1. The first rotating electric machine 2 and the second rotating electric machine 3 are disposed side by side along the front-rear direction of the vehicle 1 orthogonal to an axial direction parallel to each of the rotary shafts 2a and 3a. For example, the first rotating electric machine 2 is disposed on the rear side of the vehicle 1 in the front-rear direction, and the second rotating electric machine 3 is disposed on the front side.

The power control unit 4 is disposed below the first rotating electric machine 2 and the second rotating electric machine 3 in the up-down direction of the vehicle 1 that is orthogonal to each of the axial direction of the first rotating electric machine 2 and the second rotating electric machine 3 and the front-rear direction of the vehicle 1. The outer shape of the power control unit 4 is, for example, a rectangular parallelepiped. The direction in which the outer shape of the power control unit 4 is longest is parallel to the front-rear direction (that is, the direction in which the first rotating electric machine 2 and the second rotating electric machine 3 are arranged side by side) of the vehicle 1. A longest surface 4A of the outer shape of the power control unit 4 is orthogonal to the axial direction parallel to each of the rotary shafts 2a and 3a.

The power control unit 4 includes a first module 43, a second module 44, a third module 45, and a fourth module 46.

The first module 43 is an aggregate of multiple power semiconductor elements (transistors and diodes) constituting the first power converter 21 and the second power converter 22 or the like. The power semiconductor elements include, for example, each of the transistors UH, VH, WH, UL, VL, and WL and each freewheeling diode. The second module 44 is an aggregate of multiple condensers (capacitors) connected to the first module 43. The condensers include, for example, the first smoothing condenser 24 and the second smoothing condenser 25 and two condensers 27a. The second module 44 is disposed below the first module 43 in the up-down direction of the vehicle 1.

The third module 45 is an aggregate of multiple power semiconductor elements (transistors and diodes) of the third power converter 23. The power semiconductor elements include the first transistor S1, the second transistor S2, and a freewheeling diode. The fourth module 46 is an aggregate of various reactors including the choke coil L of the third power converter 23. The third module 45 and the fourth module 46 are disposed to the right of the first module 43 and the second module 44 in the left-right direction of the vehicle 1.

The three-phase connectors 28a and 28b connecting a terminal (terminals U1, V1, W1 and terminals U2, V2, W2) of each of the first rotating electric machine 2 and the second rotating electric machine 3 with each terminal (phase terminals Ua, Va, Wa and phase terminals Ub, Vb, Wb) of the power control unit 4 are disposed on the first direction side (for example, left side of vehicle 1 in left-right direction) in the axial direction parallel to each of the rotary shafts 2a and 3a.

As shown in FIG. 5, the rotating electric machine unit 10 includes, for example, a first case 51 and a first cover 52 that cover the first rotating electric machine 2 and the second rotating electric machine 3, and a second case 53 and a second cover 54 that cover the power control unit 4 together with a part of the first cover 52.

The outer shape of the first case 51 is, for example, a bottomed cylinder. An axial direction parallel to a central axis of the first case 51 is parallel to the axial direction of the rotary shaft 2a and the rotary shaft 3a respectively of the first rotating electric machine 2 and the second rotating electric machine 3. The first cover 52 covers an opening formed at one end (for example, rear end of vehicle 1 in front-rear direction) of the first case 51 in the axial direction. The first case 51 and the first cover 52 cover the second case 53 and the second cover 54 together with the first rotating electric machine 2 and the second rotating electric machine 3.

The outer shape of the second case 53 is, for example, a cylinder. An axial direction parallel to a central axis of the second case 53 is parallel to the axial direction of the central axis of the first case 51. The second cover 54 covers a first opening (for example, an opening on front side of vehicle 1 in front-rear direction) among the openings at both ends of the second case 53 in the axial direction. A second opening (for example, an opening on rear side of vehicle 1 in front-rear direction) of the second case 53 is covered by a part of the first cover 52.

An axial direction of the drive shaft 41 is parallel to the axial direction of the rotary shaft 2a and the rotary shaft 3a respectively of the first rotating electric machine 2 and the second rotating electric machine 3. The drive shaft 41 is disposed below the first rotating electric machine 2 in the up-down direction of the vehicle 1 and behind the power control unit 4 in the front-rear direction of the vehicle 1. The drive shaft 41 is connected to a driving wheel of the vehicle 1.

The power transmission part 42 includes, for example, multiple gears transmitting power between each of the rotary shaft 2a and the rotary shaft 3a of the first rotating electric machine 2 and the second rotating electric machine 3 and the drive shaft 41. The power transmission part 42 is disposed side by side with the first rotating electric machine 2, the second rotating electric machine 3, and the power control unit 4 on the second direction side (for example, right side of vehicle 1 in left-right direction) of the rotary shaft 2a and the rotary shaft 3a respectively of the first rotating electric machine 2 and the second rotating electric machine 3 in the axial direction.

The rotating electric machine unit 10 includes a DC cable 61 that connects the power control unit 4 with the battery 5. The DC cable 61 is disposed below the drive shaft 41 in the up-down direction of the vehicle 1. The DC cable 61 is connected to a DC connector 62 provided in the power control unit 4. The DC connector 62 is disposed in a portion in the power control unit 4 on the lower side in the up-down direction of the vehicle 1 and the rear side in the front-rear direction of the vehicle 1.

As described above, in the rotating electric machine unit 10 of an embodiment, the power control unit 4 and the drive shaft 41 are disposed on the lower side in the up-down direction of the vehicle 1 with respect to the first rotating electric machine 2 and the second rotating electric machine 3 arranged in the front-rear direction of the vehicle 1. Further, due to that the direction in which the outer shape of the power control unit 4 is longest is parallel to the front-rear direction of the vehicle 1, the first rotating electric machine 2, the second rotating electric machine 3, the power control unit 4, and the drive shaft 41 can be disposed in a compact manner.

Due to that the power transmission part 42 is disposed on one side with respect to the first rotating electric machine 2, the second rotating electric machine 3 and the power control unit 4 in the axial direction of the rotary shaft 2a and the rotary shaft 3a respectively of the first rotating electric machine 2 and the second rotating electric machine 3, arrangement efficiency of the rotating electric machine unit 10 can be improved compared to the case where the power transmission part 42 is disposed, for example, along the front-rear direction or the up-down direction of the vehicle 1.

By providing the DC cable 61 that is connected to the power control unit 4 on the rear side in the front-rear direction of the vehicle 1 and disposed on the lower side with respect to the drive shaft 41 in the up-down direction of the vehicle 1, an increase in size of an introduction path of the DC cable 61 can be suppressed. Due to that the DC cable 61 does not interfere with the power transmission part 42 in the front-rear direction of the vehicle 1, even if there is a possibility that, for example, the power transmission part 42 is displaced in the front-rear direction of the vehicle 1, damage caused to the DC cable 61 by the power transmission part 42 can be suppressed.

By providing the three-phase connectors 28a and 28b connecting each of the first rotating electric machine 2 and the second rotating electric machine 3 with the power control unit 4 on one side (left side of the vehicle 1 in the left-right direction) in the axial direction, an increase in the length required for connecting each of the first rotating electric machine 2 and the second rotating electric machine 3 with the power control unit 4 can be suppressed. The configuration and assembly process required for connection can be simplified without requiring, for example, a special extension member for connection.

Due to that the largest surface 4A of the outer shape of the power control unit 4 is orthogonal to the axial direction, the area where the power control unit 4 overlaps the power transmission part 42 as viewed from the axial direction can be increased, and the arrangement efficiency of the rotating electric machine unit 10 can be improved.

Due to that the first module 43 is disposed between the first rotating electric machine 2 and the second rotating electric machine 3 and the second module 44 in the up-down direction of the vehicle 1, heat generated from the first rotating electric machine 2 and the second rotating electric machine 3 can be suppressed from being transferred to the second module 44.

Even if there is a possibility that the first rotating electric machine 2 and the second rotating electric machine 3 and the power transmission part 42 are displaced in the front-rear direction of the vehicle 1 in the event of, for example, collision of the vehicle 1, damage caused to the power control unit 4 by the first rotating electric machine 2 and the second rotating electric machine 3 and the power transmission part 42 can be suppressed.

Due to that the power control unit 4 includes the first power converter 21 and the second power converter 22 that are integrated with each other, the arrangement efficiency of the rotating electric machine unit 10 can be improved compared to the case where, for example, the first power converter 21 and the second power converter 22 are separately provided.

By providing the second case 53 and the second cover 54 that cover the power control unit 4 together with a part of the first cover 52 that covers the first rotating electric machine 2 and the second rotating electric machine 3, the number of parts of the rotating electric machine unit 10 can be reduced.

Due to that the power control unit 4 is disposed below the first rotating electric machine 2 and the second rotating electric machine 3, an increase in the length of the piping required for the expansion tank 31 disposed at the top of the cooling system 33 circulating the coolant cooling the rotating electric machine unit 10 can be suppressed.

(Modifications)

Modifications of the embodiments are described below. The same parts as those in the above-described embodiments are designated by the same reference numerals, and the description thereof will be omitted or simplified.

In the above-described embodiments, the first rotating electric machine 2 for driving the vehicle 1 to travel is disposed on the rear side of the vehicle 1 in the front-rear direction, and the second rotating electric machine 3 for power generation of the vehicle 1 is disposed on the front side. However, the disclosure is not limited thereto.

For example, the first rotating electric machine 2 for driving to travel may be disposed on the front side, and the second rotating electric machine 3 for power generation may be disposed on the rear side.

For example, any of the first rotating electric machine 2 and the second rotating electric machine 3 that is smaller in size may be disposed on the front side, and the one larger in size may be disposed on the rear side.

The embodiments of the disclosure are presented as examples but are not intended to limit the scope of the disclosure. These embodiments can be implemented in various other forms, and various omissions, replacements, and changes can be made without departing from the gist of the disclosure. These embodiments or modifications thereof are included in the scope or gist of the disclosure, as well as in the scope of the disclosure described in the claims and the equivalent scope thereof.

What is claimed is:

1. A rotating electric machine unit, comprising:
    a plurality of rotating electric machines, having rotary shafts parallel to each other, and disposed along a first direction orthogonal to an axial direction parallel to each of the rotary shafts;
    a power control unit, controlling power transfer of each of the plurality of rotating electric machines and disposed on one side with respect to the plurality of rotating electric machines in a second direction orthogonal to the axial direction and the first direction;
    a drive shaft, parallel to the axial direction, disposed on the one side with respect to any of the plurality of rotating electric machines in the second direction and disposed on one side with respect to the power control unit in the first direction;
    an electric wire, connected from the outside of the power control unit to the one side of the power control unit in the first direction, and disposed on the one side with respect to the drive shaft in the second direction; and
    a power transmission part, transmitting power between each of the rotary shafts of the plurality of rotating electric machines and the drive shaft and disposed on one side with respect to the plurality of rotating electric machines and the power control unit in the axial direction, wherein
    a direction in which an outer shape of the power control unit is longest is parallel to the first direction.

2. The rotating electric machine unit according to claim 1, comprising:
    a connection part, connecting each of the plurality of rotating electric machines with the power control unit on one side in the axial direction.

3. The rotating electric machine unit according to claim 2, wherein
    a largest surface of the outer shape of the power control unit is orthogonal to the axial direction.

4. The rotating electric machine unit according to claim 1, wherein
    the rotating electric machine unit is mounted on a vehicle;
    the axial direction is parallel to a left-right direction of the vehicle;
    the first direction is parallel to a front-rear direction of the vehicle; and
    the second direction is parallel to an up-down direction of the vehicle.

5. The rotating electric machine unit according to claim 1, comprising:
    a connection part, connecting each of the plurality of rotating electric machines with the power control unit on one side in the axial direction.

6. A rotating electric machine unit, comprising:
    a plurality of rotating electric machines, having rotary shafts parallel to each other, and disposed along a first direction orthogonal to an axial direction parallel to each of the rotary shafts;
    a power control unit, controlling power transfer of each of the plurality of rotating electric machines and disposed on one side with respect to the plurality of rotating electric machines in a second direction orthogonal to the axial direction and the first direction;
    a drive shaft, parallel to the axial direction, disposed on the one side with respect to any of the plurality of rotating electric machines in the second direction and disposed on one side with respect to the power control unit in the first direction; and a power transmission part, transmitting power between each of the rotary shafts of the plurality of rotating electric machines and the drive shaft and disposed on one side with respect to the plurality of rotating electric machines and the power control unit in the axial direction, wherein a direction in which an outer shape of the power control unit is longest is parallel to the first direction, wherein the power control unit comprises a first module having a plurality of power semiconductor elements and a second module having at least one capacitor connected to the first module; and the second module is disposed on the one side with respect to the first module in the second direction.

\* \* \* \* \*